Nov. 13, 1923.
H. R. STOUGHTON
1,473,886
SWIVEL JOINT FOR SPEEDOMETERS
Filed April 12, 1919  2 Sheets-Sheet 1
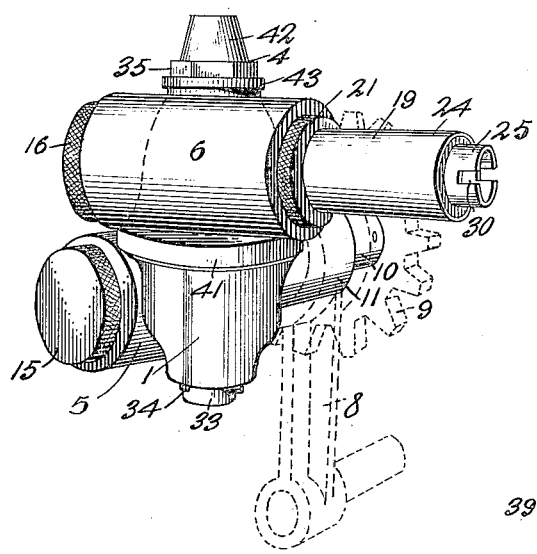
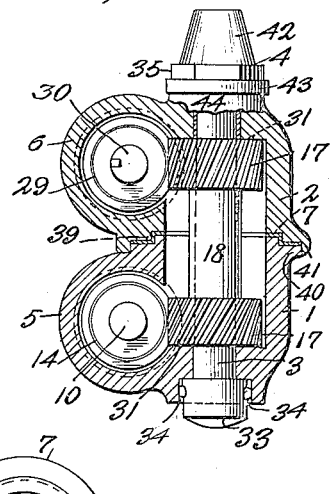
Harry R. Stoughton Inventor
By N. S. Amstutz
Atty.

Nov. 13, 1923.
H. R. STOUGHTON
SWIVEL JOINT FOR SPEEDOMETERS
Filed April 12, 1919    2 Sheets-Sheet 2
1,473,886
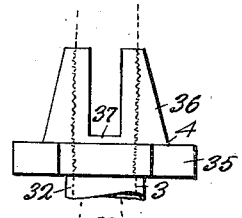
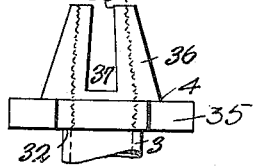
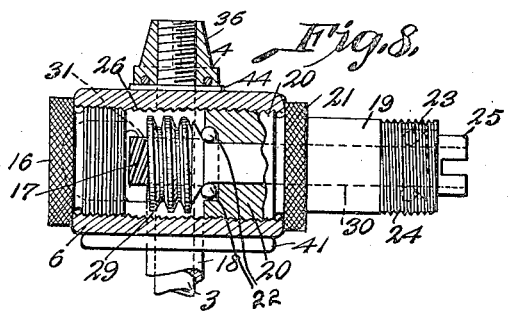
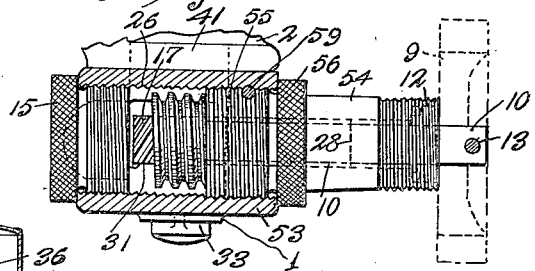
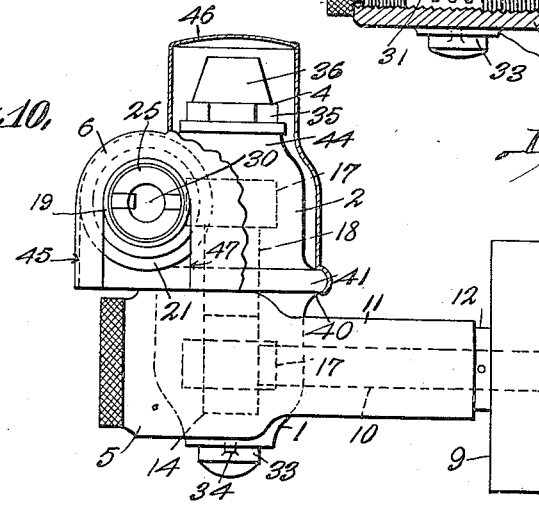
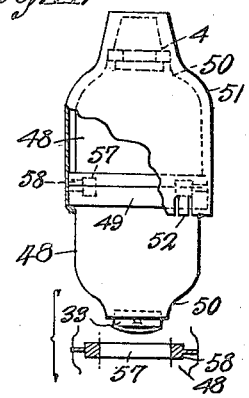
Harry R. Stoughton Inventor
By N. S. Amstutz Atty.

Patented Nov. 13, 1923.

1,473,886

UNITED STATES PATENT OFFICE.

HARRY R. STOUGHTON, OF PLYMOUTH, INDIANA.

SWIVEL JOINT FOR SPEEDOMETERS.

Application filed April 12, 1919. Serial No. 289,702.

*To all whom it may concern:*

Be it known that I, HARRY R. STOUGHTON, a citizen of the United States, residing at Plymouth, in the county of Marshall and State of Indiana, have invented certain new and useful Improvements in Swivel Joints for Speedometers, of which the following is a specification.

My invention relates to improvements in swivel joints for speedometers and it consists more especially of the features pointed out in the annexed claims.

The purpose of my invention, among other unenumerated features, is to provide a swivel joint that is absolutely dust, grit, and water-proof; that is interchangeable as to right and left hand positions on the car; that may also be interchangeable as to the two main features, called lower and upper housings; that provides a self-contained removable lock nut for taking up any wear that may develop between the housings; that provides a capped-in lock nut making it also dirt, grit, and water-proof; that provides a dirt cap to enclose the upper housing to a point below the bearing surfaces of the two housings; and that also provides a non-turnable swivel bolt which cooperates with the take-up lock nut to keep all lost motion away from between the lower and upper housings.

With these and other ends in view, I illustrate in the accompanying drawings such instances of adaptation as will disclose the broad underlying features without limiting myself to the specific details shown.

Fig. 1 is a perspective view of a complete swivel joint in assembled relation.

Fig. 2 is an elevation showing the two members standing at 90 degrees to each other with the lower tangent barrel of the stem gear in section.

Fig. 3 is an elevation showing the two members with their tangent barrels in parallel relation and the swivel parts in section.

Fig. 4 is a detached plan of a formed packing ring.

Fig. 5 is a detached end elevation of a swivel joint bolt.

Fig. 6 is a diagrammatic elevation of the first step followed in forming a lock nut.

Fig. 7 is a diagrammatic elevation of the second stage followed in forming a lock nut.

Fig. 8 is an elevation in section of a reversible tangent barrel, with interchangeable parts relating to the upper housing.

Fig. 9 is an elevation in section of a reversible tangent barrel, with interchangeable parts relating to the lower housing.

Fig. 10 is a diagrammatic elevation of the assembled housings, with an over-all dirt cap enclosing the upper housing.

Fig. 11 is a diagrammatic elevation of interchangeable duplicately formed lower and upper housings, with an enclosing dirt cap to cover their meeting edges.

The practical requirements of devices of this kind are exceedingly exacting. They must be easily taken apart to replace any pieces which have been damaged in accidents. They must, after being assembled and installed remain in dependable service throughout all conceivable handicapping conditions found in road service, whether the finest dust, the stickiest mud, adhering sleet, driving rain, or extremes of temperature are encountered, the device must continue to function.

One of the features of great importance in my swivel-joint lies in the interchangeability of the several parts which secures valuable flexibility in making installations on various types of cars and also making the device adaptable to numerous speedometer systems, while at the same time securing economy and simplicity in manufacture.

The structure instanced in the accompanying drawings secures to the user a superior article which is not subject to the disadvantages of most swivel joints in practical use heretofore. These have soon developed lost motion, formed open joints for the ingress of dirt, road dust and water which sooner or later completely incapacitates the device, or at any rate makes it a source of vexation and annoyance to the one who places dependence on it for integrity in service according to the implicit trust imposed in the device when the same was placed at his disposal.

A most annoying feature of many of the swivel joints found in practical use is the impossibility of taking them apart in case any of the members require replacement for one reason or another. This compels the user to purchase an entire new complete outfit. With my device this expense is avoided and results secured which cannot be attained with devices now found on the market.

In practically carrying out my invention I employ a lower casing or housing 1 which is held relatively stationary on a bracket 8 by means of which it is supported from an adjacent part of the motor car so as to move laterally as the steering wheel is turned to the right or left and retain the pinion 9 in mesh with the usual driving gear (not shown) attached to the wheel whose speed and distance of travel is to be indicated and registered. Seated on the lower housing, another part 2 called the upper housing is placed.

The upper housing must have free rotary movement on the lower housing, but at the same time must be kept in engagement with it. Both housings have an inner hollow space in which a pair of spiral gears 17 are placed between bearing faces 31 formed on both housings. The gears 17 are united by a hollow shaft 18 so as to move together.

The meeting surfaces of the housings are off-set so as to keep them aligned laterally, as shown in Fig. 3, and to also prevent the free traverse of dust, etc., a metallic or other packing ring 7 is placed between the adjacent bearing surfaces of the two housings. It has a ledge 39 which co-acts with a similar formation in both housings. To further "seal-off" these bearing surfaces an apron 41 depends outside of the flange 49, (Fig. 3).

The two housings with the center gears 17 and their driving and driven spindles, described hereafter, are held in assembled relation by means of a swivel bolt 3. This bolt has a head 33 which enters a recess formed at the lower end of the bottom housing. It is kept from turning by pressed-up narrow wings 34, Figures 3 and 5 which enter corresponding recesses of the housing. The bolt passes through the lower housing, hollow shaft 18, gears 17, and a hardened sleeve in the upper housing, from which it projects. A shoulder 32 is formed at this end, beyond which it is threaded for lock nut 4. This nut serves to hold all the housing parts assembled and yet quite free to be rotated with respect to each other. The nut may abut the shoulder 32 if desired, so as to not clamp the upper housing and prevent its being turned around the bolt axis quite freely. Nevertheless the efficiency of nut 4 is such that even without the shoulder 32 when the nut is once adjusted when new or after taking up any wear that it will remain where placed without developing any tendency to shift its position.

In the exacting requirements of the most strenuous road service this special type of lock nut has not been found defective—retaining position without shifting and at the same time being susceptible of instantaneous adjustment removal or replacement, without any of the limiting features found in the well-known and much elaborated class of nut locks disclosed in that art.

The unique results secured in the lock nut 4 are due to its construction which is diagrammatically shown in Figs. 6 and 7. A hexagon portion 35 is formed at one end. Next to this there is a conical portion 36 in which a slot 37 is made. The usual threaded hole passes through the conical and hexagon parts. Thus far it would be practically the same as any well known type of nut, having no "locking" features. The extreme ends of the slotted cone 36 are bent together at 38 all the way around as shown in Fig. 7 after which the whole is hardened. This causes these ends to always thereafter have a positive gripping action on the bolt 3, or whenever the nut may be used.

If the nut slot 37 is not closed in some way, water, mud and grit can gain access to the interior of the housings, even though a felt washer may be used under the nut. To overcome this disadvantage I may enclose the nut in a thin stamped-up sheet metal casing 42, shown in Fig. 2. This has an apron 43 which surrounds the neck 44 of the upper housing. The casing 42 is pressed onto the nut and crimped in any desired manner to fasten it to the nut so that both are handled as a unit.

Both housings 1 and 2 have tangential barrels in which connecting shafts and gears are placed. In barrel 5 of the lower housing the stem gear 14 is supported on its shaft 10. This shaft or spindle extends through the projection 11, wherein it has bearing in hardened sleeves 28. An outer packing ring follower 12 is secured to the spindle and any kind of felt or other washer may be placed between the follower 12 and the extension 11. The extreme outer end of the shaft 10 supports the drive gear 9 secured by a cotter pin 13 which rests in a slot formed in the face of the gear. Numerous other means of fastenings are used in practice to adapt the spindle 10 to receive various types of gears peculiar to certain speedometer systems. A grease cap 15 closes the threaded end 27 and thus completes the lower housing.

The upper housing 2 is provided with the tangent barrel 6 for the T gear 29. This gear has the spindle or shaft 30 extending through the removable bearing part 19, which has a knurled flange 21, a large threaded inner end 20 and a smaller threaded outer end 24 formed thereon. Ball bearing 22 at the inner end co-acts with the gear 29 and the outer one 23 with slotted cone ring 25 rotatable with the shaft. The usual flexible shaft between the swivel joint and the speedometer is driven by the ring 25 and held in place by a sleeve (not shown) which engages threaded end 24. The threaded opening 26 passes entirely through the barrel, the other end of which is closed by a grease cap 16. This construction makes it easy to exchange the places of parts 16 and 19 and thus adapt the device to either right or left hand drive.

This feature of interchangeability can also be employed in the case of the lower housing as instanced in Fig. 9 wherein the tangent barrel 53 threaded throughout its length at one end receives the bearing stem 54 which has a threaded portion 55 and a knuckled flange 56, and at the other end a grease cap 15, closes the opening. This form of extension for certain purposes gives more strength to the entire barrel 5 than if it is die-cast in one piece as shown is Figs. 2 and 10. The extension 54 and cap 15 may be exchanged as desired but in either case the extension is finally locked in place in any suitable manner, for instance by a pin 59 or other expedient.

The advantage of interchangeability can be still further made use of as instanced in Fig. 11. In this exemplification the two housings are made as duplicates of each other, either one however serving a radically different purpose from the other. The upper and lower housings 48 have similar necks 50 and similar adjacent flanges 49. These flanges may be omitted if desired and the external surfaces of both housings adjacent their meeting edges formed flush. In either case the packing ring 57 is made somewhat similar to the small cross section shown parenthetically below Fig. 11 wherein an annular edge bearing 58 is formed on the under and upper faces of the ring so as to leave the adjacent surfaces of both housings duplicates of each other. These edges take side strains and keep the parts aligned with the swivel bolt.

In order to further protect the swivel joint against any tendency for dirt, etc., to reach its moving parts a casing 46 is placed over the upper housing as shown in Fig. 10. This may be slotted at 47 to slip over extension 19, the barrel 6 being extended at 45 to meet the lower edge of the casing. A bead may also be formed to snub over flange 41 to hold the casing in position. In the event of closing up the slot 47, an opening large enough to let the threaded portion 20 of extension 19 pass through after which the replacement of extension 19 in the tangent barrel will effectively close the casing against the admission of any undesirable particles of any kind whatever. A similar casing 51 with straight sides at its lower edge may be used in connection with the interchangeable housings, and tongues 52 formed to snub under flange 49.

It is apparent from the description and the exemplifications instanced in the accompanying drawings that this device is exceedingly simple and economical to manufacture. The operation is most efficiently maintained by reason of the precision of the related parts. In use the pinion 9 rotates spindle 10 and gear 14. This gear meshes with one of the gears 17 and the companion gear 17 meshes with the gear 29 on spindle 30 from which the usual speedometer parts are actuated.

It is immaterial if any of the spiral gears are substituted by bevel gears or any parts are replaced by substantial equivalents, for such substitutions come within the spirit of my invention.

What I claim is,

1. In a swivel connection for shafts, a shell comprising two sections each carrying a barrel, one of said barrels having interchangeably secured in its two ends a bearing sleeve and a cap, a reversible shaft journaled in said sleeve and having a gear adjacent one end, a geared shaft in the other barrel and connecting gearing in the shell.

2. In swivel joints, a lower housing, an upper housing rotatable on the lower housing, both housings having interacting recessed edges in the meeting surfaces of the two housings, a formed packing ring placed between the housings adapted to engage the recesses to assist in keeping the housings in axial alignment, means external of the packing for sealing off the adjacent edges of the two housings, and means for removably holding the parts in operative relation to each other, 3. In swivel joints, lower and upper housings, a swivel bolt extending axially through the same, a tangential opening formed in each of the housings, central gears on the swivel bolt, separate gears supported centrally of the tangential openings adapted to both engage the central gears on the swivel bolt, said supports being removable and reversible to adapt the separate gears to function in various positions demanded by different types of cars, different points of attachment and different speedometer systems, and means for preventing the swivel bolt turning on its axis while the upper housing is free to rotate thereon while held in place by a continuously acting and removable lock nut threaded on the other end of the swivel bolt.

4. In swivel joints, two interchangeable duplicate members adapted to have movement with respect to each other, means for holding them in engagement with each other, a transmitting member supported within the other members, a side enlargement to each of duplicate members, driving and driven means interchangeably supported in the enlargements in working relation to the transmitting member, means for holding the several parts in assembled relation, and means comprising a removable cap for protecting the parts from injury through the action of dirt, grit, dust, water, etc.

5. In swivel joints a pair of duplicate members in pivotal relation to each other, tangential internally threaded hubs for each, motion transmitting means coacting with each other in the duplicate members and the tangential hubs, whereby the transmitting parts are operable within any of the hub ends.

6. In swivel joints, a pair of pivoted members having duplicate tangential hubs thereon, interconnected driving means within each of the members, separate transmitting means in one hub of each member, closing caps for the other hubs, and means for holding the members in pivoted relation and the driving means in engagement with each other.

7. In swivel joints, a pair of pivoted members, axial retaining means for both, a lock nut attached to one end of said means, external of one of the members, and a protective cap enclosing the nut while said cap engages said member.

8. In swivel joints, a pair of pivoted members, a central support for both, hubs projecting from the members, and an enclosing cap covering one of said members while engaging the other member.

In testimony whereof I affix my signature.

HARRY R. STOUGHTON.